US011771026B2

(12) United States Patent
Chan et al.

(10) Patent No.: US 11,771,026 B2
(45) Date of Patent: Oct. 3, 2023

(54) APPARATUS, A SYSTEM, A METHOD AND A LIGHT CONTROL DEVICE FOR FACILITATING HYDROPONIC CULTIVATION

(71) Applicant: Aspara Limited, Hong Kong (HK)

(72) Inventors: Sze Yin Yvonne Chan, Hong Kong (HK); Chun Yuen Lam, Hong Kong (HK); Kwong Wai Leung, Hong Kong (HK)

(73) Assignee: Aspara Limited, Hong Kong (HK)

( * ) Notice: Subject to any disclaimer, the term of this patent is extended or adjusted under 35 U.S.C. 154(b) by 0 days.

(21) Appl. No.: 18/048,045

(22) Filed: Oct. 20, 2022

(65) Prior Publication Data

US 2023/0115545 A1    Apr. 13, 2023

Related U.S. Application Data

(62) Division of application No. 16/228,839, filed on Dec. 21, 2018, now abandoned.

(Continued)

(51) Int. Cl.
*A01G 31/00* (2018.01)
*A01G 31/02* (2006.01)
(Continued)

(52) U.S. Cl.
CPC ............ *A01G 31/02* (2013.01); *A01G 7/045* (2013.01); *A01G 27/001* (2013.01); *A01G 27/003* (2013.01); *A01G 27/005* (2013.01); *G08B 5/36* (2013.01); *H05B 45/10* (2020.01); *H05B 45/12* (2020.01); *H05B 47/11* (2020.01); *A01G 2031/006* (2013.01); *G08B 21/182* (2013.01); *G08B 21/187* (2013.01); *H05B 45/325* (2020.01)

(58) Field of Classification Search
CPC .. A01G 27/001; A01G 27/003; A01G 27/005; A01G 27/006; A01G 27/008; A01G 27/02; A01G 2031/006; A01G 31/02
See application file for complete search history.

(56) References Cited

U.S. PATENT DOCUMENTS

2008/0222949 A1 * 9/2008 Bissonnette ........... A01G 7/045
47/60
2019/0183062 A1 * 6/2019 Pham ..................... A01G 9/022
(Continued)

FOREIGN PATENT DOCUMENTS

CN          105941122 A  *  9/2016

*Primary Examiner* — Trinh T Nguyen

(57) ABSTRACT

A hydroponic cultivation apparatus, a system and a method for facilitating hydroponic cultivation is disclosed. The hydroponic cultivation apparatus includes a reservoir, a plinth, a grow tray with a grow tray lid, and a docking with coupler. The reservoir, placed upon the plinth, is located at a higher position adjacent to the grow tray for optimizing liquid circulation from the reservoir to the grow tray and vice-versa using one or more pipes, a solenoid valve and a pump. The base further includes a dock coupled to the grow tray for providing an electrical connectivity to the grow tray and simultaneously allowing the liquid to flow through the grow tray without being leaked. Further, the apparatus is having a roof which is provided with sources of illumination for providing light required for plant growth.

20 Claims, 16 Drawing Sheets

Related U.S. Application Data

(60) Provisional application No. 62/609,498, filed on Dec. 22, 2017.

(51) Int. Cl.
| | |
|---|---|
| *A01G 27/00* | (2006.01) |
| *G08B 5/36* | (2006.01) |
| *A01G 7/04* | (2006.01) |
| *H05B 45/10* | (2020.01) |
| *H05B 47/11* | (2020.01) |
| *H05B 45/12* | (2020.01) |
| *G08B 21/18* | (2006.01) |
| *H05B 45/325* | (2020.01) |

(56) References Cited

U.S. PATENT DOCUMENTS

| | | | | |
|---|---|---|---|---|
| 2020/0344965 | A1* | 11/2020 | Song | H05B 47/16 |
| 2021/0100173 | A1* | 4/2021 | Khwaja | H05B 45/12 |
| 2021/0144942 | A1* | 5/2021 | Ofir | A01G 7/045 |
| 2022/0174890 | A1* | 6/2022 | Wantland | A01G 31/02 |
| 2022/0322625 | A1* | 10/2022 | Adams | A01G 31/06 |
| 2022/0369566 | A1* | 11/2022 | Venkata | A01G 9/16 |
| 2022/0408673 | A1* | 12/2022 | Penn | A01G 31/06 |

\* cited by examiner

Fig. 8

Display is a hidden design, integrated to the base.

221

222

224

220

223

Sensing Probe 132

APPARATUS, A SYSTEM, A METHOD AND A LIGHT CONTROL DEVICE FOR FACILITATING HYDROPONIC CULTIVATION

CROSS-REFERENCE TO RELATED APPLICATIONS AND PRIORITY

The present application is a Divisional application of U.S. patent application Ser. No. 16/228,839 filed on Dec. 21, 2018, which claims priority from U.S. Provisional Patent Application No. 62/609,498 filed on Dec. 22, 2017, the entirety of which is incorporated herein by a reference.

TECHNICAL FIELD

The present application described herein, in general, relates to an apparatus, a system and a method for hydroponic cultivation.

BACKGROUND

Market research shows that more and more people in the world are concern with food safety and willing to pay more for healthy food. In addition to purchasing market available vegetables, some people have started to grow their own vegetables at home. However, there exist challenges or difficulties in growing vegetables at home, primarily due to lack of gardening space, appropriate weather condition and planting knowledge. Outdoor planting has also been prone to the bug attack due to soil and external environmental factors.

In recent years, hydroponic cultivation has become popular for growing home vegetables due to its soilless feature which makes it easier and cleaner to operate indoor. There have been quite a few indoor mini hydroponic systems available in the market in recent years. However, the available systems are restricted to only one single, non-adjustable setup for lighting, or these only have mechanical adjustment on a stem pole to coarsely adjust light intensity. These systems lack specific adjustment of light intensity and spectrum to fit specific plant growth needs.

Further, the available systems are also limited by their growing methods. For example, deep water culture or ebb & flow method, in which, grow base is too wide (a big opening surface area) which becomes hard for user to handle with (to avoid spilling of water). Also, most of these systems can only have the massive water container put directly under plant growth area.

Another challenge faced by these existing systems is to determine appropriate level of the nutrient required at different stages of the growth of the plant, and therefore, the wrong consumption of the nutrient may lead to plant growth failure. Thus, there is a long-felt need in the existing art to provide more sophisticated, programmable, yet simple to use system for hydroponic cultivation.

SUMMARY

This summary is provided to introduce concepts related to apparatus, systems and methods for hydroponic cultivation and the concepts are further described below in the detailed description. This summary is not intended to identify essential features of the claimed subject matter nor is it intended for use in determining or limiting the scope of the claimed subject matter.

In one implementation, a hydroponic cultivation apparatus is disclosed. The apparatus may include a cabinet for providing a housing for a reservoir, a plinth, and a grow tray with a grow tray lid. The grow tray may be placed on a base of the cabinet in such a manner that the reservoir, placed upon the plinth, is located at a higher position adjacent to the grow tray for optimizing liquid circulation from the reservoir to the grow tray and vice-versa using one or more pipes, a solenoid valve and a pump. The base may further include a dock coupled to the grow tray for providing an electrical connectivity to the grow tray and simultaneously allowing the liquid to flow through the grow tray without being leaked. The base may further include one or more touch buttons for receiving user input and a display for displaying notification to the user. The cabinet may have a roof provided with sources of illumination for providing light required for plant growth. The roof may further comprise connection pads coupled to a sensing probe placed within the reservoir for providing an electrical connectivity to the sensing probe and simultaneously allowing the liquid to flow through the plinth without being leaked.

In another implementation, a system for facilitating hydroponic cultivation is disclosed. The system may include a reservoir placed upon a plinth, a grow tray with a grow tray lid, a grow tray liquid level sensor associated with the grow tray, a reservoir liquid level sensor associated with the reservoir, a solenoid valve, a pump, a processor and a memory coupled to the processor. The processor may execute a plurality of programmed instructions stored in the memory. The processor may execute one or more programmed instructions to detect whether the reservoir, the grow tray, and the reservoir liquid level sensor are placed in a predefined position. Further, the processor may execute one or more programmed instructions to open the solenoid valve, based upon the detection, for allowing liquid to flow from the reservoir to the grow tray through a first pipe connecting the reservoir to the grow tray. In one embodiment, the reservoir may be located at a higher position adjacent to the grow tray. The processor may further execute one or more programmed instructions to detect liquid level in the grow tray and the reservoir using the grow tray liquid level sensor and the reservoir liquid level sensor respectively. The processor may further execute one or more programmed instructions to close the solenoid valve to stop the flow of the liquid from the reservoir to the grow tray when the liquid level in the grow tray reaches at a predefined maximum level or the liquid level in the reservoir reaches at a predefined minimum level. The processor may further execute one or more programmed instructions to activate the pump, after closing the solenoid valve, to allow the liquid to flow back from the grow tray into the reservoir through a separate second pipe in order to optimize dissolving of oxygen into the liquid through a separate path. Further, the processor may execute one or more programmed instructions to deactivate the pump once the liquid level in the grow tray reaches to a predefined minimum level or the liquid level in the reservoir reaches to a predefined maximum level.

In yet another implementation, a method for facilitating hydroponic cultivation is disclosed. The method may include detecting, via a processor, whether a reservoir, a grow tray, and a reservoir liquid level sensor are placed in a predefined position. The method may further include opening, via the processor, a solenoid valve, based upon the detecting, for allowing liquid to flow from the reservoir to the grow tray through a first pipe connecting the reservoir to the grow tray. In one embodiment, the reservoir may be located at a higher position adjacent to the grow tray. The method may further include detecting, via the processor, liquid level in the grow tray and the reservoir using the grow tray liquid level sensor and the reservoir liquid level sensor respectively. Further, the method may comprise closing the solenoid valve to stop the flow of the liquid from the reservoir to the grow tray when the liquid level in the grow tray reaches at a predefined maximum level or the liquid level in the reservoir reaches at a predefined minimum level. The method may further include activating a pump, after closing the solenoid valve, to allow the liquid to flow back from the grow tray into the reservoir through a separate second pipe in order to optimize dissolving of oxygen into the liquid through a separate path. Further, the method may include deactivating the pump once the liquid level in the grow tray reaches to a predefined minimum level or the liquid level in the reservoir reaches to a predefined maximum level.

In yet another implementation, a non-transitory computer readable medium storing a program for facilitating hydroponic cultivation is disclosed. The program may include instructions for detecting whether a reservoir, a grow tray, and a reservoir liquid level sensor are placed in a predefined position. The program may include instructions for opening a solenoid valve, based upon the detecting, for allowing liquid to flow from the reservoir to the grow tray through a first pipe connecting the reservoir to the grow tray. In one embodiment, the reservoir may be located at a higher position adjacent to the grow tray. The program may further include instructions for detecting liquid level in the grow tray and the reservoir using the grow tray liquid level sensor and the reservoir liquid level sensor respectively. Further, the program may include instructions for closing the solenoid valve to stop the flow of the liquid from the reservoir to the grow tray when the liquid level in the grow tray reaches at a predefined maximum level or the liquid level in the reservoir reaches at a predefined minimum level. The program may further include instructions for activating a pump, after closing the solenoid valve, to allow the liquid to flow back from the grow tray into the reservoir through a separate second pipe in order to optimize dissolving of oxygen into the liquid through a separate path. The program may further include instructions for deactivating the pump once the liquid level in the grow tray reaches to a predefined minimum level or the liquid level in the reservoir reaches to a predefined maximum level.

In yet another implementation, a light control device for hydroponic cultivation is disclosed. The light control device may include sources of illumination, a plurality of channels, in which, each of the plurality of channels comprises the sources of illuminations, and a user interface for receiving a user input. The light control device further includes a processor and a memory coupled to the processor. The processor may be configured to execute a plurality of programmed instructions stored in the memory. The processor may execute one or more programmed instructions to receive the user input, via the user interface, indicating a mode selected amongst a plurality of modes. Each mode of the plurality of modes has a predefined intensity level required for growth of plant. Further, the processor may execute one or more programmed instructions to adjust intensity of the sources of illumination of the one or more channels based on the user input.

In yet another implementation, a method for controlling light for hydroponic cultivation is disclosed. The method may include receiving, via a user interface, a user input indicating a mode selected amongst a plurality of modes. Each mode of the plurality of modes has a predefined intensity level required for growth of plant. The method may further include adjusting, via the processor, intensity of sources of illumination of the one or more channels based on the user input.

In still another implementation, a non-transitory computer readable medium storing a program for controlling light for hydroponic cultivation is disclosed. The program may include instructions for receiving, via a user interface, a user input indicating a mode selected amongst a plurality of modes. Each mode of the plurality of modes has a predefined intensity level required for growth of plant. The program may further include instructions for adjusting, intensity of a source of illumination of the one or more channels based on the user input.

BRIEF DESCRIPTION OF THE DRAWINGS

The detailed description is described with reference to the accompanying figures.

FIG. 8 illustrates a LED physical layout design, in accordance with an embodiment of the present application.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1A:
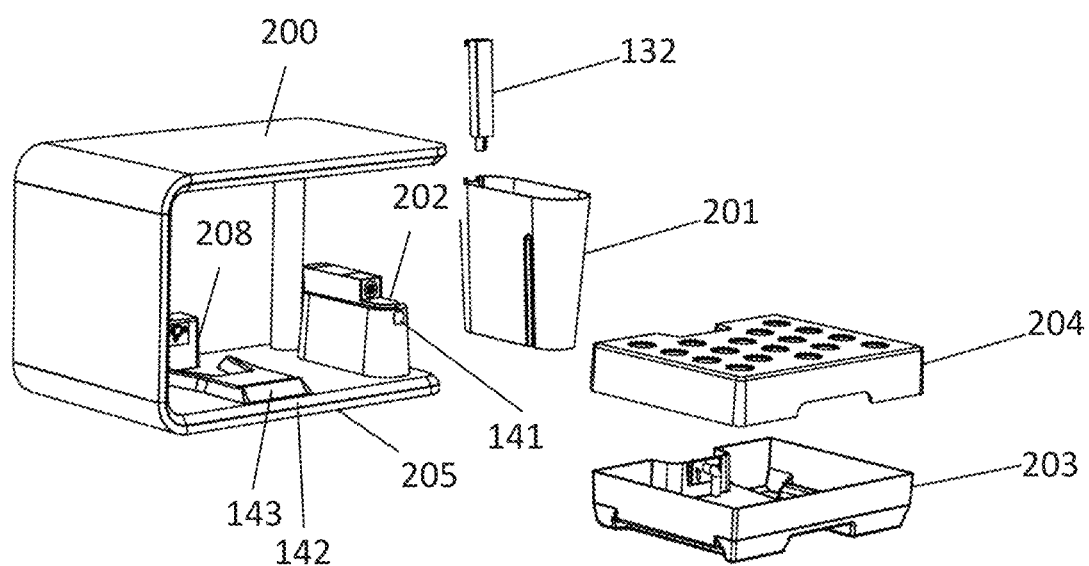
FIGS. 1a and 1b illustrate a hydroponic cultivation apparatus, in accordance with an embodiment of the present application.
Figure 1B:
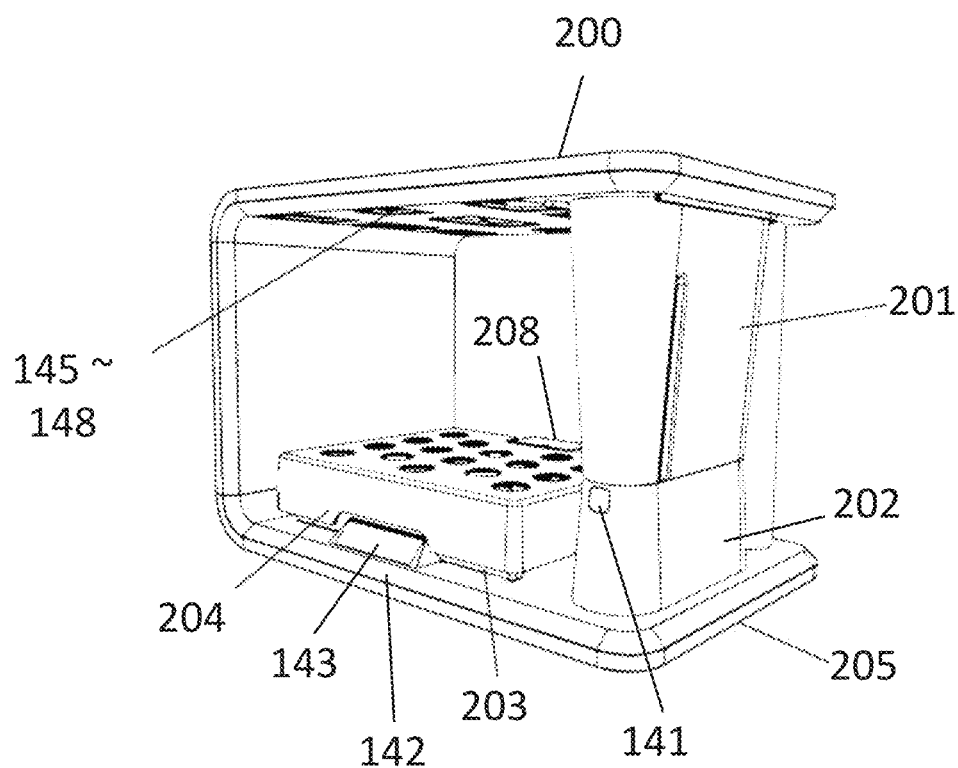
Figure 7:
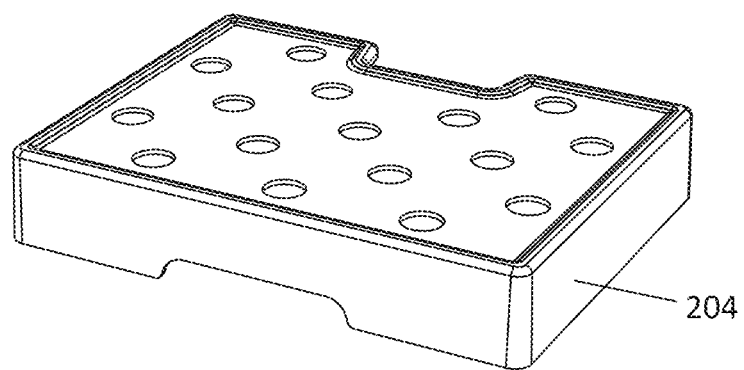
FIG. 7 illustrates a grow tray lid design of the hydroponic cultivation apparatus, in accordance with an embodiment of the present application.

The present application generally relates to a reverse Ebb and flow for facilitating a hydroponic cultivation. In other words, the flow of water in a traditional/conventional Ebb and flow hydroponics system has been reversed in the present application for achieving various advantages and technical effect, which will be explained in detail in subsequent paragraphs of the specification. According to embodiments of the present application, the hydroponic cultivation apparatus for facilitating hydroponic cultivation is illustrated in FIGS. 1a and 1b. The hydroponic cultivation apparatus includes a cabinet 200 for providing housing for a reservoir 201, a plinth 202, and a grow tray 203 with a grow tray lid 204 which are placed on a base 205 of the cabinet 200. The grow tray lid 204 basically provides a support which lets the plants rest and grow. A design of the grow tray lid 204 is shown in FIG. 7. It is designed in such a manner that when the grow tray lid 204 is removed from the grow tray 203 for checking or cleaning of the grow tray 203, the grow tray lid 204 stand up on its own for root protection. Further, the particular design of the grow tray lid 204 also avoids squashing and pushing out of grow baskets 220 when the grow tray lid 204 is placed on a flat surface.

Further, unlike traditional hydroponic apparatuses (shown in FIG. 12), the reservoir 201, of the disclosed hydroponic cultivation apparatus, is located at a higher position adjacent to the grow tray 203. Placing the reservoir 201 at the higher position than the grow tray 203 helps in optimizing liquid circulation from the reservoir 201 to the grow tray 203 and vice-versa. The liquid circulation from the reservoir 201 to the grow tray 203 may be performed using one or more pipes 209, 211, a solenoid valve 107 and a pump 108, which are explained below in detail with reference to FIG. 2.

The hydroponic cultivation apparatus further includes a dock 208 placed on the base 205 of the cabinet 200. The dock 208 is coupled to the grow tray 203 in such a manner that the coupling not only provides an electrical connectivity to the grow tray 203, but also provide liquid flow connectivity between the grow tray 203 and the reservoir 201 without leakage during the operations of the hydroponic cultivation. The coupling between the dock 208 and the grow tray 203 is explained in detail with reference to FIGS. 6a and 6b.

Figure 6A:
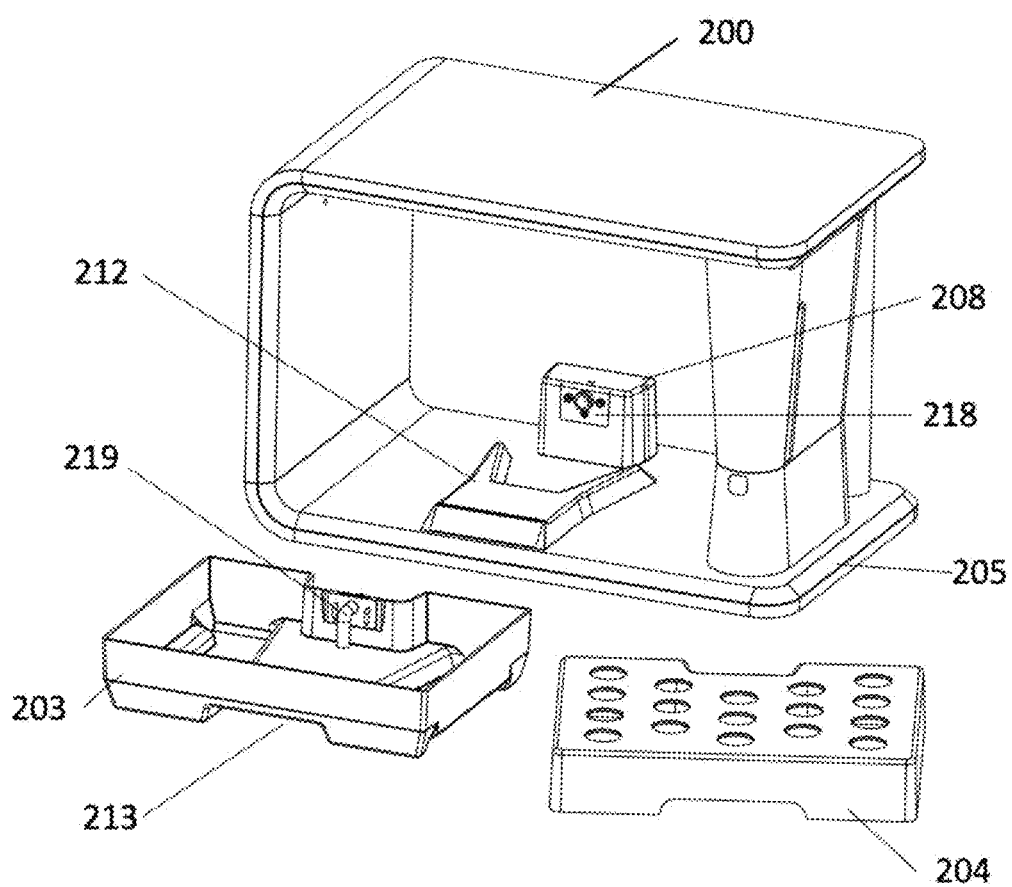
FIG. 6a and FIG. 6b illustrate docking and coupling of a dock and grow tray of the hydroponic cultivation apparatus, in accordance with an embodiment of the present application.
Figure 6B:
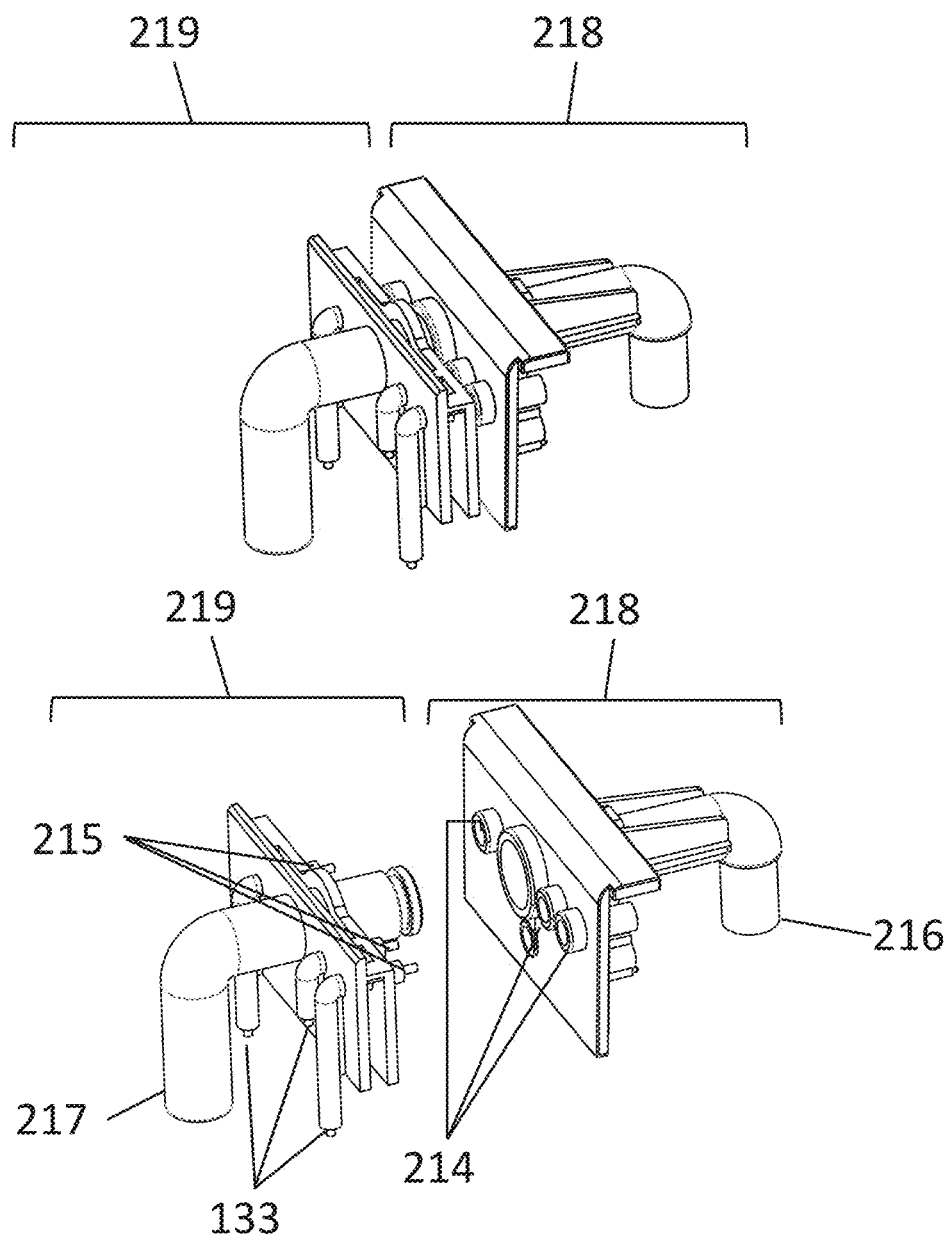

As shown in FIGS. 6a and 6b, the dock 208 is coupled to the grow tray 203 using a pair of couplers 218, 219 and a pair of pogo pins 214, 215. In an embodiment, the dock 208 may comprise a female coupler 218, whereas the grow tray 203 may comprise a male coupler 219. The female coupler 218 comprises a water pipe 216 and the pogo pin pads 214, whereas the male coupler 219 comprises a water pipe 217 and pogo pins 215. The coupling is done by connecting the coupler pair 218 and 219 such that it allows the liquid to flow in and out of the grow tray 203 through the water pipes 216 and 217 in one plug in action without leakage. At the same time, the grow tray 203 is also electronically connected with the pogo pins 215 plugged into the pogo pin pads 214 on the dock 208. Hence, as stated above, the dock 208 provides the electrical connectivity to the grow tray 203 and simultaneously allows the liquid to flow through the grow tray 203 without being leaked. Further, a trail 212 on the base of the cabinet 200 matching groove 213 at the bottom of the grow tray 203 is provided to guide the position of the grow tray 203 to the dock 208.

Figure 2:
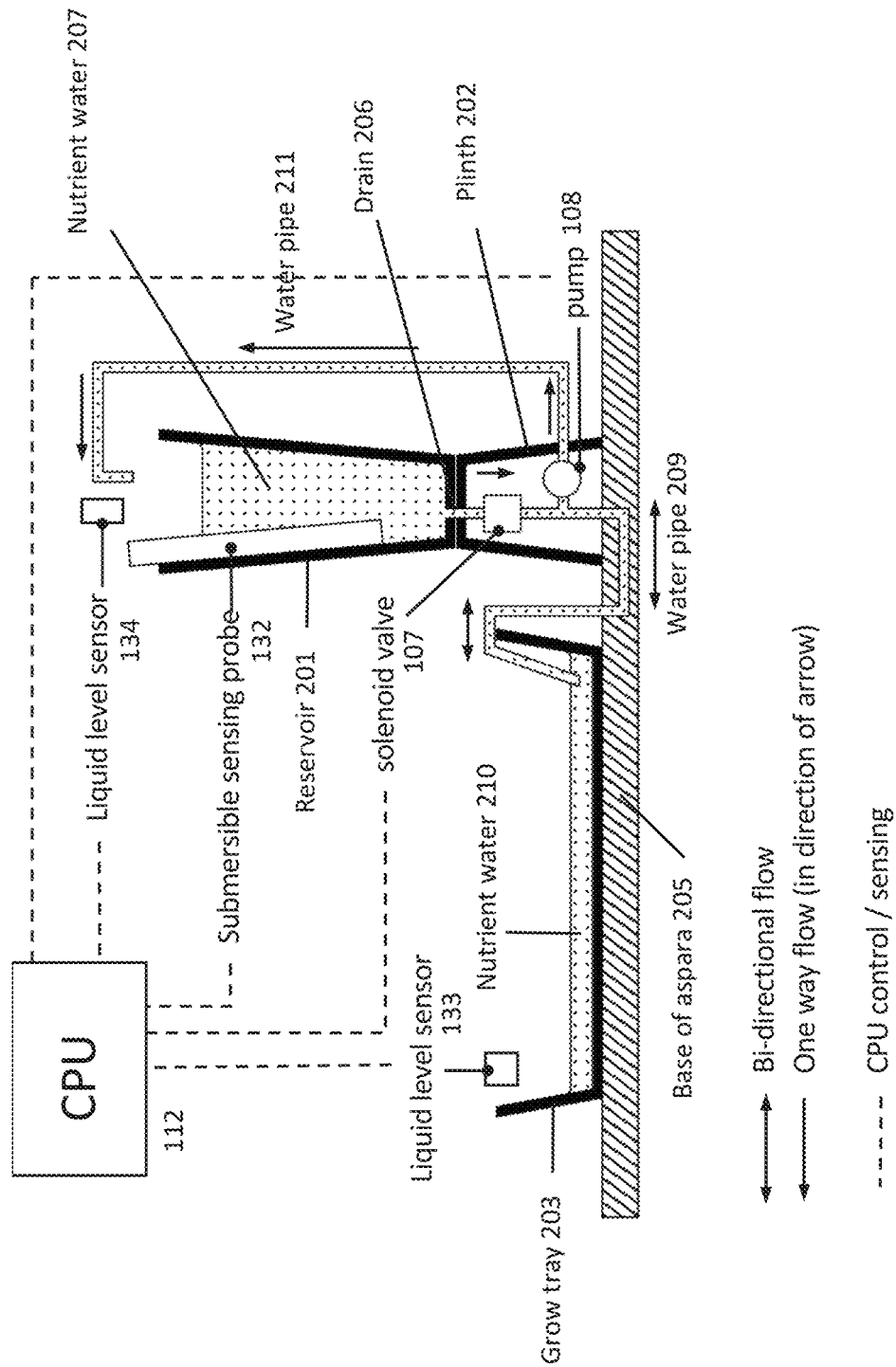
FIG. 2 illustrates reverse Ebb and flow water system for facilitating a hydroponic cultivation, in accordance with an embodiment of the present application.
Figure 4:
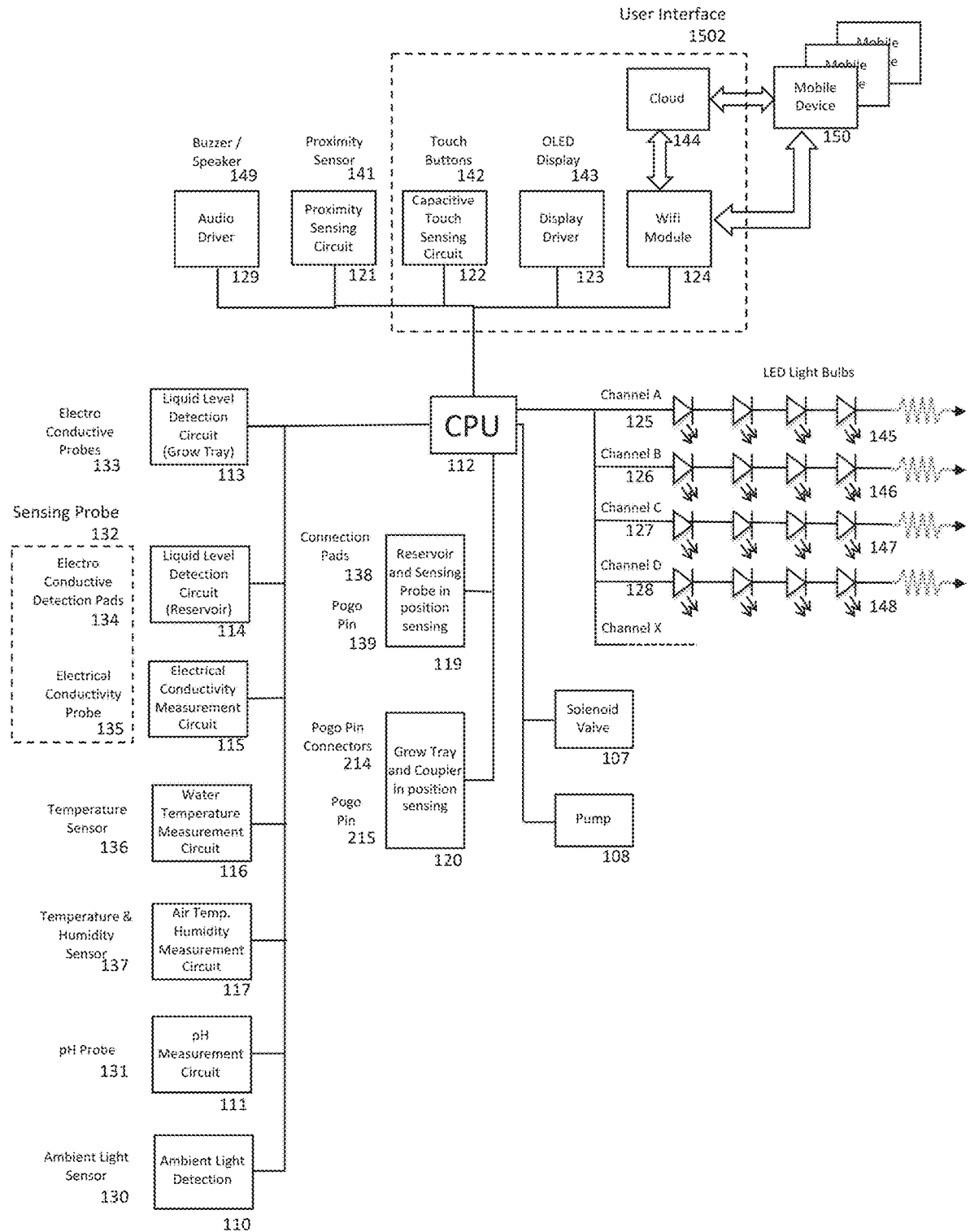
FIG. 4 illustrates a block diagram of components of the system for facilitating the hydroponic cultivation, in accordance with an embodiment of the present application.
Figure 17:
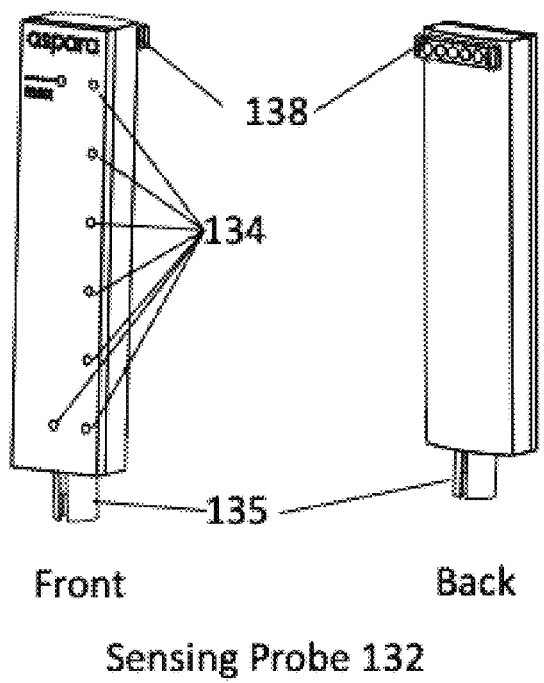
FIG. 17 illustrates sensing probe of the hydroponic cultivation apparatus, in accordance with an embodiment of the present application.
Figure 17:
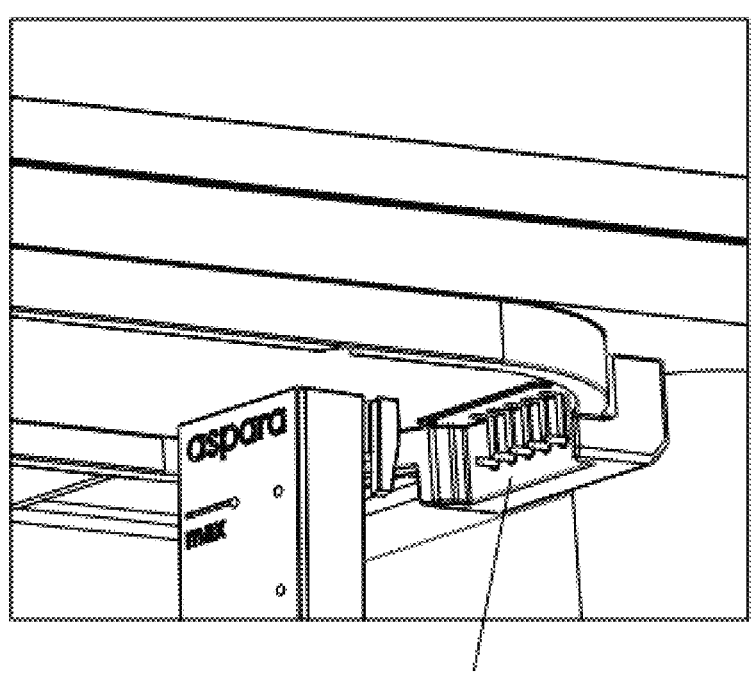

As shown in FIG. 17, the sensing probe 132 placed inside the reservoir 201 is coupled to system's CPU (i.e., a processor 112 as shown in FIG. 4) using a pair of connection pads 138 and pogo pins 139. The coupling facilitates an electrical connectivity to provide power to the sensing probe 132 and to collect sensor data from the sensing probe 132. The senor data may include liquid level detection data, electrical conductivity measurement data, water temperature measurement data, and pH measurement data. Each of the sensor data is explained in detail in subsequent paragraphs of the specification. Further, the aforesaid connection is done by one action that fits reservoir 201, with sensing probe 132 inside, to the plinth 202. At the same time, the reservoir 201 is connected to the plinth 202 (as shown in FIG. 1a, FIG. 1b and FIG. 2) such that it allows the liquid to flow out of the reservoir 201 through the solenoid valve 107 and the water pipes 209 to the grow tray 203 without being leaked.

Figure 11:
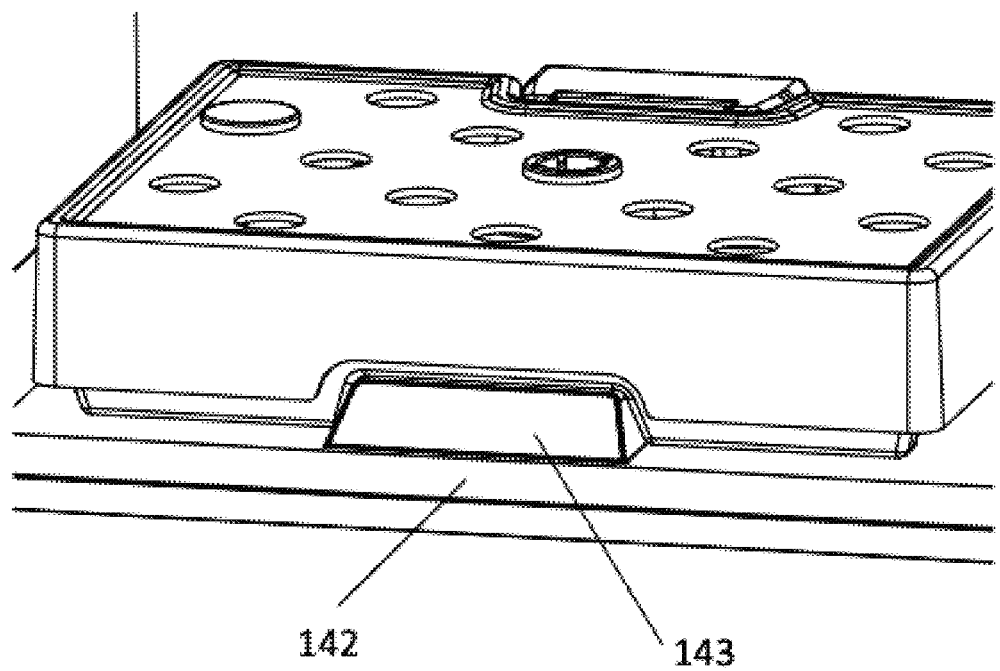
FIG. 11 illustrates a display of the hydroponic cultivation apparatus, in accordance with an embodiment of the present application.

In addition, the hydroponic cultivation apparatus further comprises one or more touch buttons 142 and a display 143 placed at the base 205 of the cabinet 200 as shown in FIG. 11. The one or more touch buttons 142 coupled with capacitive touch sensing circuitry 122 is used for receiving user input. For example, the user can manually control the light intensity by using the touch buttons 142. Further, the display 143 coupled with display driver 123 is used for displaying notification to the user. The display 143 shown in FIG. 11 is an OLED display integrated to the base 205 of the cabinet 200 of the hydroponic cultivation apparatus. In some embodiments, the display 143 may also comprise other types of display such as light-emitting diode (LED) display or any other display capable of providing notification to the user. The display 143 shown in FIG. 11 is integrated with the base 205 in a hidden manner by covering it with a 0.4 mm thickness solid PVC sheet. The display 143 may automatically turn OFF when the hydroponic cultivation apparatus is in idle state for a period of time, for example 5 minutes or 10 minutes. However, the display 143 may also automatically turn ON when the hydroponic cultivation apparatus wakes up either by power up sequence or waken up from sleep mode by detection of either touch on touch buttons 142 or motion by a proximity sensor 141, coupled with proximity sensing circuit 121, attached with the plinth 202 of the said apparatus.

Along with the base 205, the cabinet 200 of the hydroponic cultivation apparatus also have a roof provided with sources of illumination for providing light required for plant growth. According to embodiments of present application, the sources of illumination may comprise a plurality of light-emitting diode (LED) light bulbs 145-148 as shown in FIG. 1b. It must be understood to a person skilled in the art that the source of illumination may not be limited to LED bulbs and can further include various other light sources which are capable of emitting light and therefore can be used in the hydroponic cultivation apparatus for the plant growth.

Figure 14:
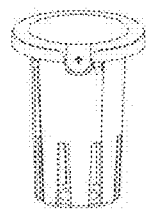
FIG. 14 illustrates accessories of the hydroponic cultivation apparatus, in accordance with an embodiment of the present application.
Figure 14:
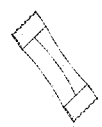
Figure 14:
Figure 14:
Figure 14:
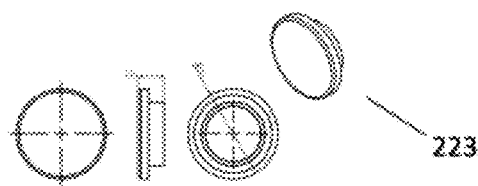

In addition, the hydroponic cultivation apparatus comprises various accessories which have been shown in FIG. 14. For example, the accessories may include seed kits, grow hole covers 223 and germination domes 224. The seed kits may provide seed capsules 221 and nutrient 222 which are tailor-made to fit into and work together with the hydroponic cultivation apparatus. Further, the seed capsule 221 may contain seeds of a specific plant species placed on a growing media, that is fitted in the grow basket 220. Further, the grow hole covers 223 may be placed on the holes of the grow tray lid 204 where user does not place any seed capsules 221 into those holes. Further, the germination domes 224 may be transparent domes which are placed on top of each seed capsule for plant germination.

Figure 12:
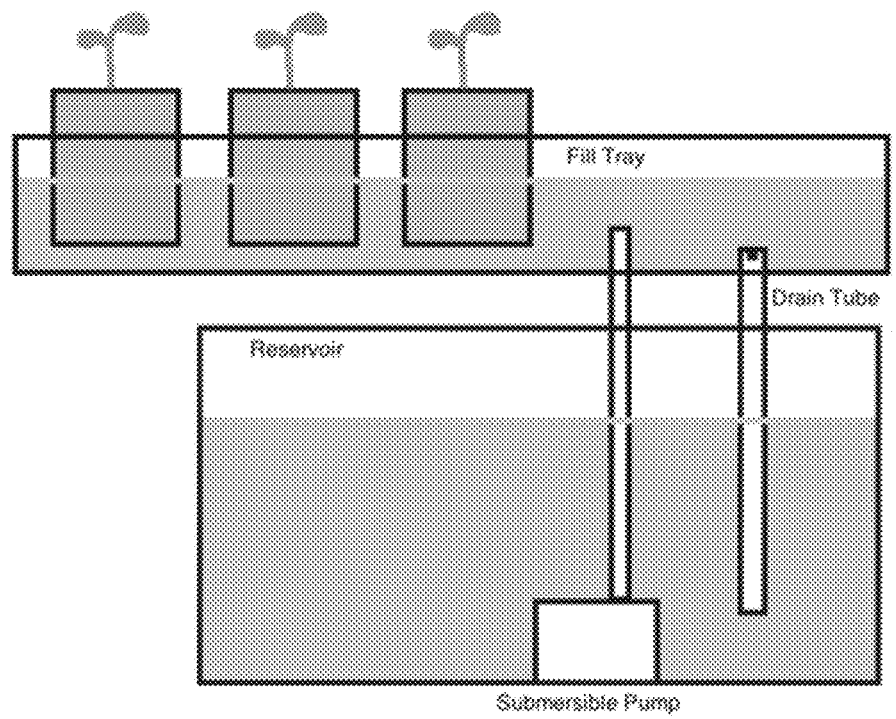
FIG. 12 illustrates a traditional ebb and flow systems for the hydroponic cultivation.

The hydroponic cultivation apparatus and arrangement of its components disclosed above provides various advantages over the traditional hydroponic cultivation apparatuses (shown in FIG. 12). One of the advantages discussed above is that, the disclosed hydroponic cultivation apparatus enhances user experience and improve product design by placing the reservoir 201 at the higher position than the grow tray 203, instead of at the bottom of the grow tray 203 such that user may refill or refresh liquid in the system without disturbing the growing plants. The other advantages and technical effects have been discussed in below paragraphs with reference to other figures of the present application.

Figure 3:
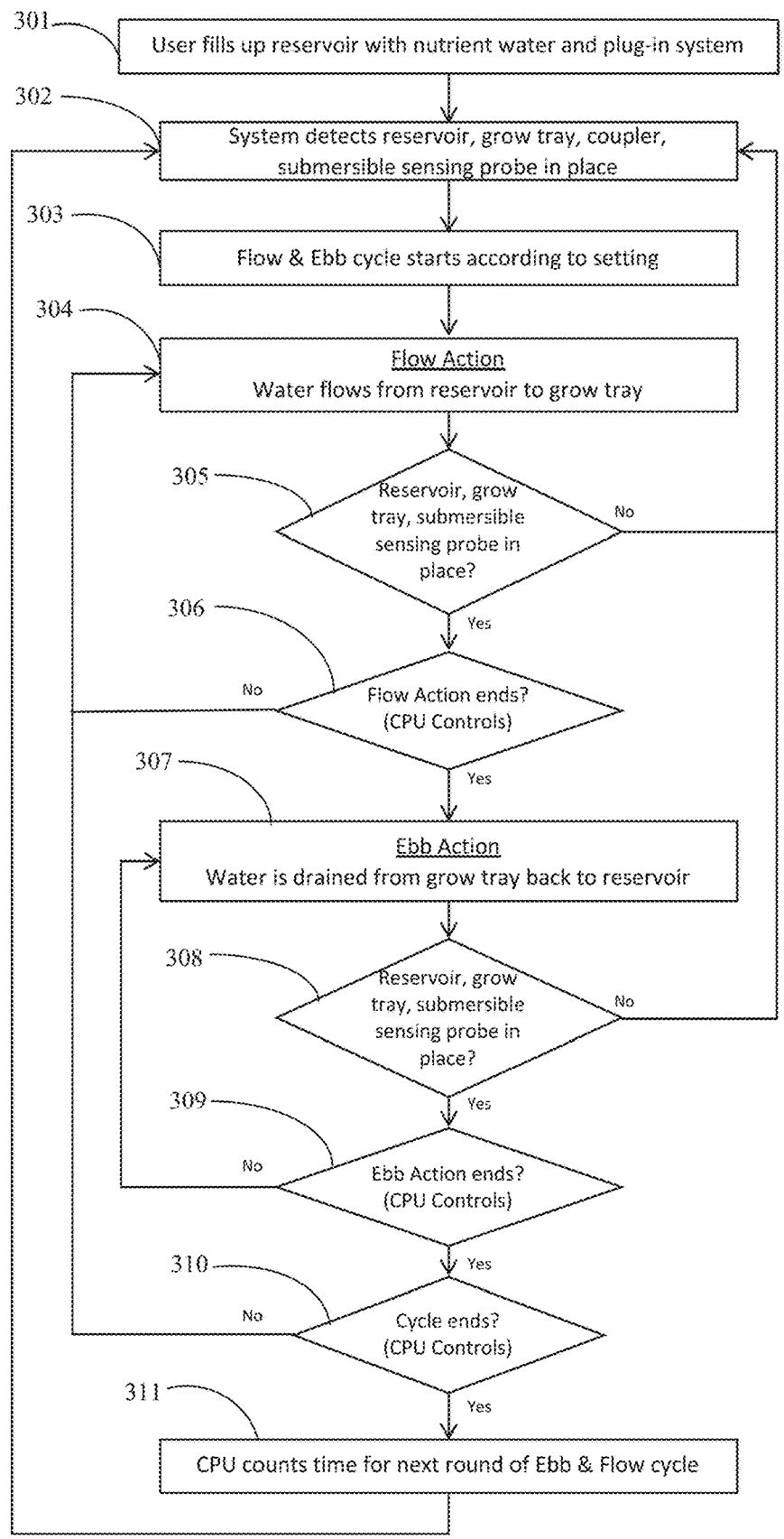
FIG. 3 illustrates a flowchart of reverse Ebb and flow cycle operations for facilitating the hydroponic cultivation, in accordance with an embodiment of the present application.

Now referring to FIGS. 2, 3 and 4, a detail working of a system for facilitating a hydroponic cultivation is explained here in detail. The system may be a dedicate hardware with various sensors/components which may be implemented with the hydroponic cultivation apparatus. In accordance with embodiments of the present application, the system may be implemented as Aspara™ system. The system may comprise a reservoir 201 placed upon a plinth 202, a grow tray 203 with a grow tray lid 204, a grow tray liquid level sensor 133 and a reservoir liquid level sensor 134 associated with the grow tray 203 and the reservoir 201 respectively, a solenoid valve 107, a pump 108, a processor 112, and a memory coupled to the processor 112. The grow tray liquid level sensor 133 and the reservoir liquid level sensor 134 may be a submersible sensor which may be placed within the grow tray 203 and the reservoir 201 respectively. Further, the processor 112 is shown as a central processing unit (CPU) in FIGS. 2 and 4 which may fetch and execute computer-readable instructions stored in the memory to carry out various operations of the system. Further, the processor 112 may be implemented as one or more microprocessors, microcomputers, microcontrollers, digital signal processors, state machines, logic circuitries, and/or any devices that manipulate signals based on operational instructions.

Basically, the system is implemented to perform a reverse Ebb and flow cycle operation which is advantageous over the traditional Ebb and flow cycle operation. In the traditional approach as shown in FIG. 12, the liquid circulation starts from grow tray to reservoir and back from reservoir to grow tray using a submersible pump because the grow tray is located at higher position than the reservoir. Whereas, on the contrary, in the present approach, the liquid circulation starts from the reservoir 201 instead of the grow tray 203, since the reservoir is located at the higher position than the grow tray 203. This specific arrangement can be seen from FIG. 2.

Once the user fills up the reservoir 201 with the liquid (having nutrient) and plug-in the system (block 301 of FIG. 3), the operation of the system starts with detecting whether the reservoir 201 together with the sensing probe 132 (shown in FIG. 17), and the grow tray 203 together with the coupler 219 are placed in a predefined position (block 302 of FIG. 3). The reservoir liquid level sensor 134 may be built on the sensing probe 132 (shown in FIG. 17). For detecting the position, the system may use various sensor circuitries like 119 and 120 (shown in FIG. 4). The sensor circuitry 119 connected to pogo pin connector 139 is used to sense contact with connection pads 138, for sensing whether the reservoir 201 together with the sensing probe 132 are in proper position or not (shown in FIG. 17). The sensor circuitry 120 connected to pogo pin pads 214 is used to sense contact with pogo pins 215 for sensing whether the grow tray 203 together with the coupler 219 is in proper position or not (shown in FIGS. 6a and 6b).

Once it is determined that all the components (201, 203, 219 and 132) are in the predefined position, the system starts the reverse Ebb and flow cycle operations for facilitating the hydroponic cultivation (block 303 of FIG. 3). The operation starts with opening the solenoid valve 107 for allowing the liquid to flow from the reservoir 201 to the grow tray 203 through a first pipe 209 connecting the reservoir 201 to the grow tray 203 (block 304 of FIG. 3). Due to the liquid flow, the level of the liquid gradually increases in the grow tray 203 and decreases in the reservoir 201. The liquid contains essential nutrients which are used for growing the plant. During the liquid flow, the system continues to check whether the reservoir 201, the grow tray 203, the coupler 219, and the sensing probe 132 (shown in FIG. 17) are placed in the predefined position (block 305 of FIG. 3). If at any stage of the liquid flow, the system detects any of the reservoir 201, the sensing probe 132, the grow tray 203 and the coupler 219 not in the predefined position, the system stops the liquid flow and send notification to the user on the display 143. The system restarts the operations only when all the components i.e., 201, 203, 219 and 132 are placed in the predefined position again.

During the liquid flow operation, the system detects the liquid level in the grow tray 203 and the reservoir 201 using the grow tray liquid level sensor 133 and the reservoir liquid level sensor 134 respectively. If it is detected that the liquid level in the grow tray 203 reaches at a predefined maximum level and/or the liquid level in the reservoir 201 reaches at a predefined minimum level, the system closes the solenoid valve 107 to stop the flow of the liquid from the reservoir 201 to the grow tray 203 (block 306 of FIG. 3). Meeting of the above conditions means that either the liquid level in the grow tray 203 has reached at the certain level which may create an overflow condition, or the liquid has been fully exhausted or about to exhaust in the reservoir 201. It should be understood that, while the liquid is in the grow tray 203, the plant soaks up nutrient, water and oxygen from the liquid, thereby nutrient level changes in the liquid and dissolved oxygen decreases in the liquid. Hence, it becomes important to circulate the liquid or change the liquid in the grow tray 203 with fresh nutrient liquid from reservoir 201 to make the hydroponic cultivation more effective.

For liquid circulation, the system activates the pump 108, after closing the solenoid valve 107, to allow the liquid to flow back from the grow tray 203 into the reservoir 201 through a separate second pipe 211 (block 307 of FIG. 3). The usage of the second pipe 211 provides a separate path for the liquid circulation. Due to the separate path, when the liquid in the grow tray 203 (which has now become less dissolved oxygen) flows back to the reservoir 201 using the second pipe, it however flows back from the top of the reservoir 201. Hence, allowing the liquid to dissolve with the oxygen more efficiently, and thereby increasing the oxygen level in the liquid.

While flowing the liquid back into the reservoir 201, the system continues to check the position of the reservoir 201, the grow tray 203, the coupler 219, and the sensing probe 132 (block 308 of FIG. 3), and if any fault is detected, the system stops the liquid flow and send the notification to the user on the display 143 of the system. While flowing the liquid into the reservoir 201, if it is detected that the liquid level in the reservoir 201 reaches to a predefined maximum level or the liquid level in the grow tray 203 reaches to a predefined minimum level, the system deactivates the pump 108 (block 309 at FIG. 3) and reopens the solenoid value 107, thus allowing to liquid (which is now again with more dissolved oxygen) to flow into the grow tray 203 for making the hydroponic cultivation more effective (blocks 310 and 311 of FIG. 3).

From the above discussed approach, it can be observed that, unlike the traditional approach (as shown in FIG. 12), by providing the separate path, the oxygen now can be more efficiently dissolve into the liquid. In addition, the system also comprises an electrical conductivity sensor 135 (shown in FIG. 17) to measure nutrient concentration value indicating nutrient concentration in the liquid. In one embodiment, the electrical conductivity sensor 135 may be built on the sensing probe 132 (shown in FIG. 17). As it was discussed above that, the plant soaks up the nutrient and water from the liquid, nutrient content in the liquid changes, and hence it becomes important to adjust or maintain the nutrient level in the liquid at a predefined level to provide appropriate nutrition to the plant for effective hydroponic cultivation. In case the measured nutrient concentration value is detected to be less than threshold value associated with the nutrient concentration, the system displays a notification on the display 143 of the system informing the user about the decreasing nutrient level in the liquid. The system also passes this information to a nutrient dispenser (not shown in Figure) which is coupled to the electrical conductivity sensor 135. According to an embodiment, the nutrient dispenser may include a mini storage cabinet for storing the nutrient in a tablet/capsule or liquid or gaseous form. In response to the information passed, the nutrient dispenser injects the nutrient into the reservoir 201 to increase the nutrient level in the liquid. Hence, when the liquid is passed into the grow tray 203 becomes more nutritious for making the hydroponic cultivation effective.

In addition to the above, the system further comprises various other sensors/circuits/electronic components which have been discussed here below in detail with reference to FIG. 4. For example, these other sensors/circuits/electronic components include the grow tray liquid level sensor 133, the reservoir liquid level sensor 134, the electrical conductivity sensor 135 are associated with circuits 113, 114 and 115 respectively. These circuits (113-115) are the electronic circuits which help in functioning of their corresponding sensors (133-135). Further, the system also comprises a temperature sensor 136 associated with circuit 116, temperature & humidity sensor 137 associated with circuit 117, pH sensor 131 associated with circuit 111 (also referred as pH Measurement Circuit 111), and an ambient light sensor 130 associated with circuit 110. These circuits i.e., 116, 117, 111, and 110 are the electronic circuits which help in functioning of their corresponding sensors i.e., 136, 137, 131, and 130 respectively.

The temperature sensor 136 is used to detect the temperature of the liquid in the reservoir 201 and the grow tray 203. The temperature & humidity sensor 137 is used to detect the room air temperature and the relative humidity where the system is placed. The pH sensor 131 is used to detect pH value in the liquid. According to an embodiment, the pH sensor 131 along with pH Measurement Circuit 111 is located inside the reservoir 201 to detect the pH value in liquid. In case the measured value of the pH is out of a predefined pH range, the system generates an alert and displays it on the display 143 of the system. In addition, the system may also send a notification to a user device associated with the user. The ambient light sensor 130 is used to sense ambient light intensity in an environment. The output of the ambient light sensor 130 is further used by a light control device explained below in detail.

The system further comprises a buzzer/speaker 149 coupled to an audio driver 129 used to provide audio output to the user. The system further comprises a wi-fi module 124 for enabling it to connect with user devices 150 and a cloud server 144 via a network (wireless network, a wired network or a combination thereof). The connectivity helps the user devices 150 to communicate with the system and the cloud server 144 via an application residing in the user devices 150. Examples of the user devices 150 may include, but are not limited to, a portable computer, a personal digital assistant, a handheld device and a workstation. According to the embodiments of present application, the above discussed notifications generated by the system may be transmitted to the user device 150 using the wi-fi module 124 or through the cloud server 144.

Figure 15:
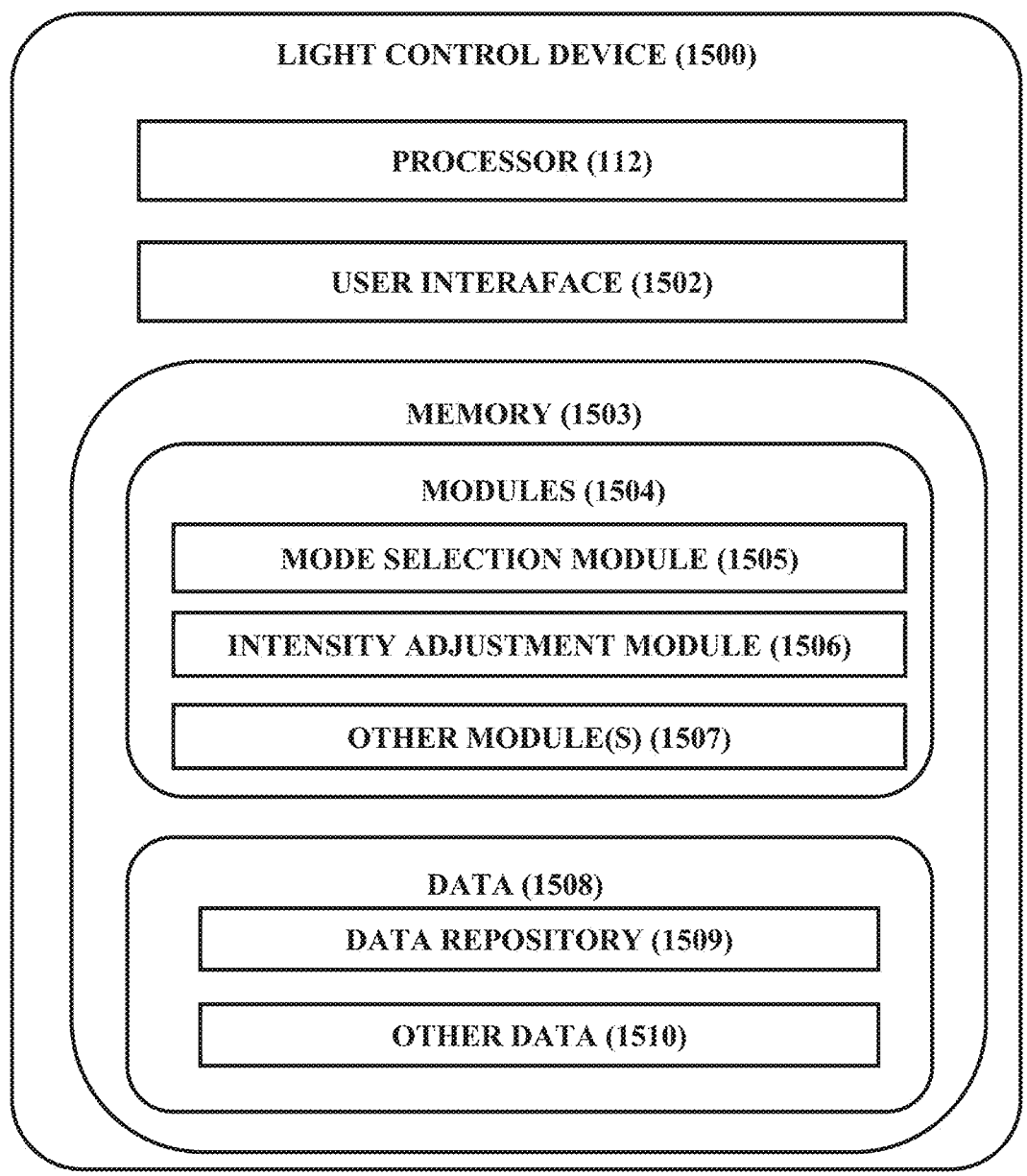
FIG. 15 illustrates components of a light control device for hydroponic cultivation, in accordance with an embodiment of the present application.

As discussed above with reference to FIGS. 2, 3 and 4, it is understood how effectively the oxygen gets dissolved with the liquid and how the nutrient level is maintained for efficient hydroponic cultivation. However, still another factor required for making the hydroponic cultivation more efficient is proper light control. For this, the present application discloses a light control device 1500, which is illustrated in FIG. 15.

According to embodiments of the present application, the light control device 1500 may comprise sources of illumination, a plurality of channels 125-128, a processor 1501, a user interface 1502, and a memory 1503. In one embodiment, the processor 1501 may be configured to execute a plurality of instructions stored in the memory 1503 of the light control device 1500. In one embodiment, each of the plurality of channels comprises the sources of illumination. In one embodiment, the sources of illumination may comprise a plurality of light-emitting diode (LED) light bulbs 145-148. The memory 1503 further comprises modules 1504 and data 1508. The modules 1504 include mode selection module 1505, intensity adjustment module 1506, and other modules 1507. The data 1508 comprises data repository 1509 and other data 1510.

In an implementation the memory 1503 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and memory cards.

In one embodiment, the modules 1504 include routines, programs, objects, components, data structures, etc., which perform particular tasks, functions or implement particular abstract data types. In another embodiment, the modules 1504 may be a dedicated hardware component or circuit capable of performing operations of the light control device 1500.

In one embodiment, the data repository 1509 may be configured to store the data processed, received, and generated by one or more of the modules 1504. The other data 1510 may include data generated as a result of the execution of one or more modules 1507.

To start the operation, the mode selection module 1505 may receive a user input indicating a mode selected amongst a plurality of modes. The plurality of modes comprises a germination mode, a normal planting mode, a fast planting mode, a slow planting mode, and a harvest mode. It must be understood that each mode of the plurality of modes has a predefined intensity level and nutrient level required for growth of plant. The intensity level depends upon the type of the plant to be cultivated, timing, environment, temperature and other factors which may affect the growth of the plant in the hydroponic cultivation. Further, the user input may be received via the user interface 1502 which may be touch screen or any means capable of receiving the user input.

In one exemplary embodiment, the hydroponic cultivation may require LEDs of a target wavelength at 680 nm (red), 440 nm (blue), 390 nm (UV) and white LEDs for effective growth of the plant. In one exemplary embodiment, an optimal value of R to B ratio as 3:1 may be for most effective vegetative growth.

Figure 13:
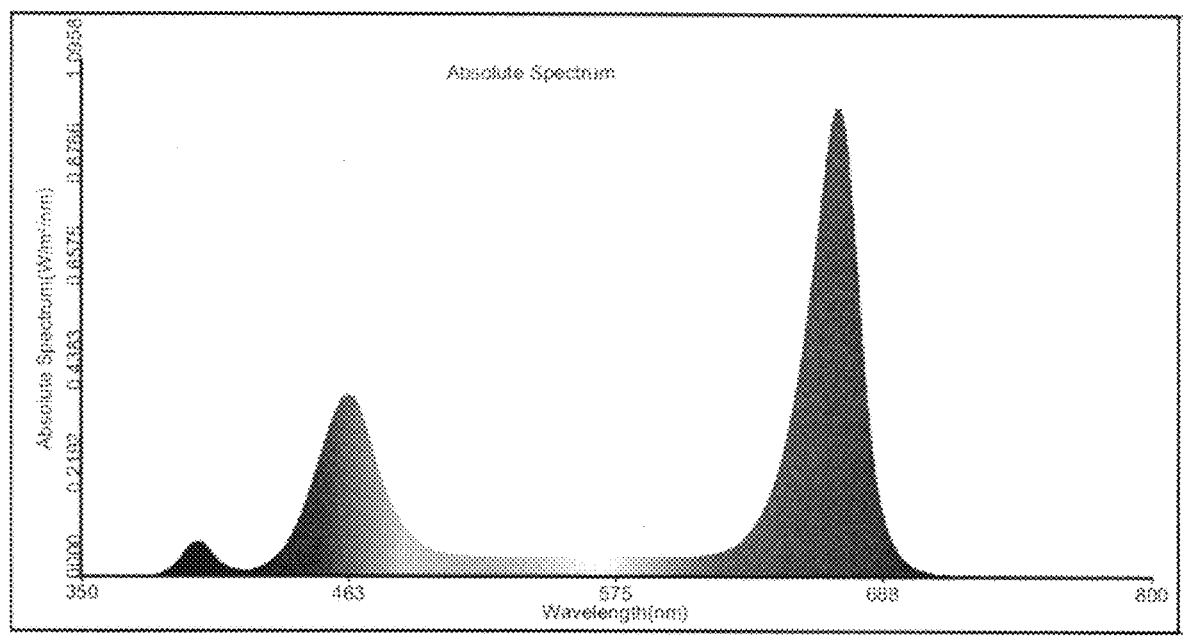
FIG. 13 illustrates different light spectrum applied per a particular grow mode of the hydroponic cultivation apparatus, in accordance with an embodiment of the present application.

Although most useful spectrums in photosynthesis are red and blue, while most green light is reflected off the plant and plays a much smaller role in plant growth. However, the LED Light bulbs 145-148 of the light control device may blend red, blue, green lights for light color temperature balance to allow a more natural light visually to user, as shown in FIG. 13.

Further, the settings required for each of the modes is shown in below table:

TABLE 1 illustrating settings required for each mode of the plurality of modes.

| Modes | Settings |
|---|---|
| Germination Mode | Total Light intensity 120 µmol m$^{-2}$s$^{-1}$<br>R:B 1:1<br>Ebb & flow cycle is not in operation<br>EC range: 800-1000 µS/cm |
| Plant Growth (Normal planting Mode) | 200 µmol m$^{-2}$s$^{-1}$<br>R:B 4:1<br>Ebb & flow cycle is on, default setting is 15 mins per hour<br>EC range: 1500-1800 µS/cm |
| Plant Growth (Fast planting Mode) | 240 µmol m$^{-2}$s$^{-1}$<br>R:B 7:1<br>Ebb & flow cycle is on, default setting is 15 mins per hour<br>EC range: 1500-1800 µS/cm |
| Plant Growth (Slow planting Mode) | 160 µmol m$^{-2}$s$^{-1}$<br>R:B 1:1<br>Ebb & flow cycle is on, default setting is 15 mins per hour<br>EC range: 1500-1800 µS/cm |

TABLE 1-continued illustrating settings required for each mode of the plurality of modes.

| Modes | Settings |
|---|---|
| Harvest Mode | Total Light intensity 160 µmol m$^{-2}$s$^{-1}$<br>R:B 1:1<br>Ebb & flow cycle is on, default setting is 15 mins per hour<br>EC range: 800-1000 µS/cm |

In one embodiment, the intensity adjustment module 1506 may adjust the intensity of the sources of illumination of the one or more channels based on the user input. In one embodiment, the intensity of sources of illumination 145-148 associated with channels 125, 126, 127, 128 (or more channels) may be adjusted according to the light intensity settings.

In one exemplary embodiment, total intensity of light may be at maximum 240 µmol m-2s-1. In one embodiment, intensity of the sources of illumination may be adjustable with Pulse Width Modulation (PWM) control for full range intensity adjustment from 0 to maximum 240 µmol m-2s-1 in order to achieve control of the light from all OFF to all ON. Sources of illumination may be grouped into four channels or more. The intensity source of illumination associated with each channel may be programmed individually to cater blending of different amount of red/blue/UV/white light for different grow modes.

Figure 8:
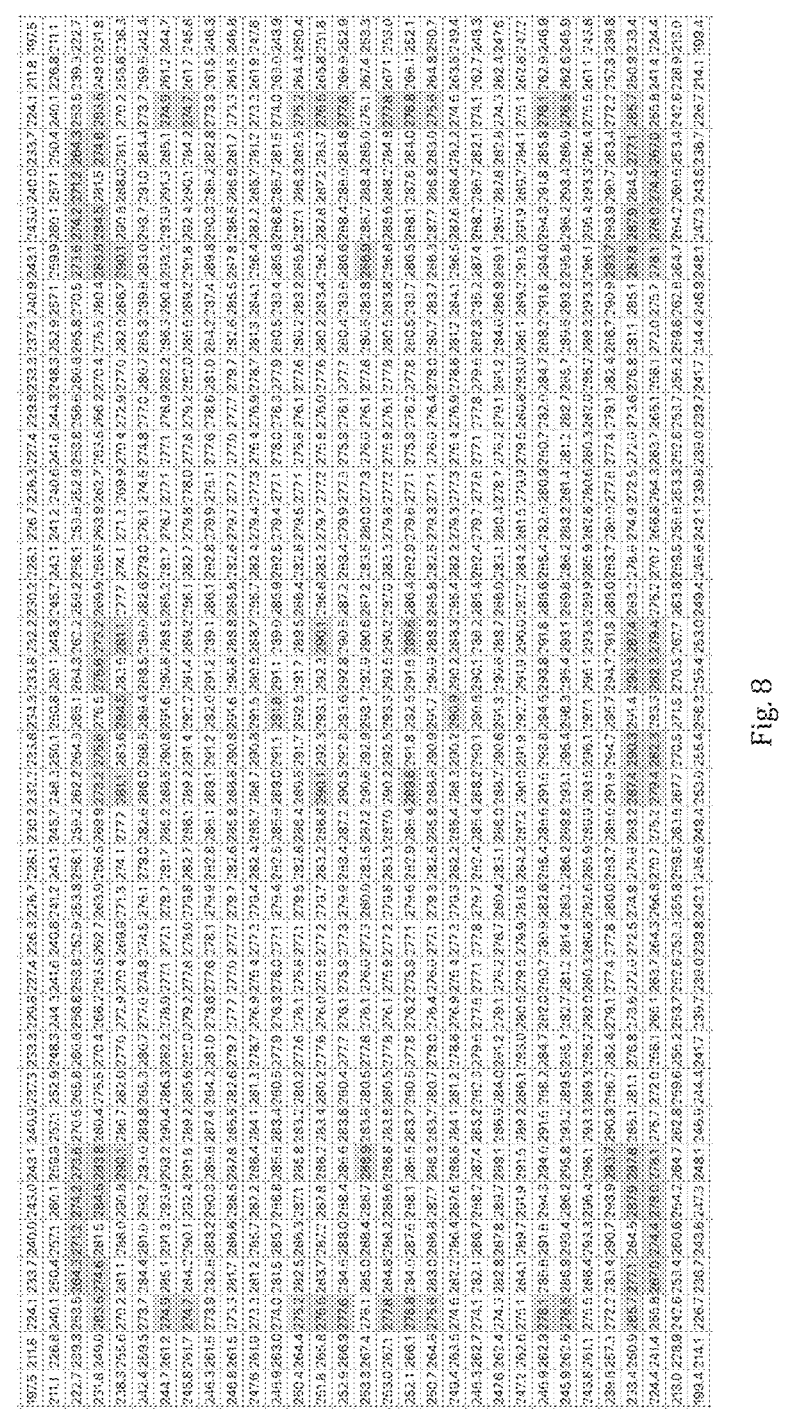

Now referring to FIG. 8, a LED physical layout design is illustrated, in accordance with the embodiment of the present application. In one embodiment, LED physical layout design may comprise plurality of LED light bulbs 145, 146, 147, 148 to deliver evenly distributed light intensity across the whole plant grow area.

Figure 9:
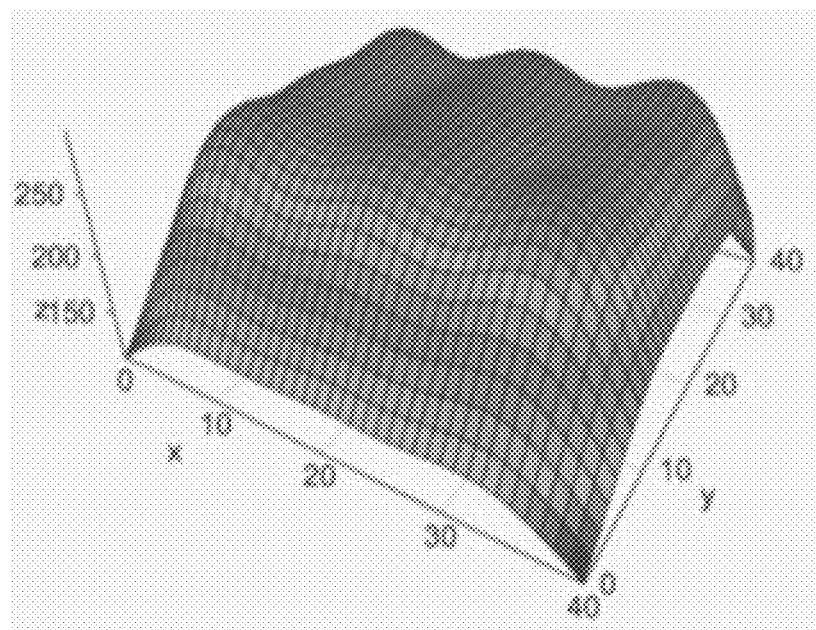
FIG. 9 illustrates a measurement of light intensity 10 cm away from plurality of LED light bulbs, showing even distribution of light energy across whole grow tray of size 334 mm×259 mm, with light intensity range of 200-300 $\mu mol\ m^{-2}s^{-1}$, in accordance with an embodiment of the present application.

Now referring to FIG. 9, a measurement of light intensity 10 cm away from plurality of LED light source, showing even distribution of light energy across the whole grow tray 203 of size 334 mm×259 mm, with light intensity range of 200-300 µmol m$^{-2}$s$^{-1}$ is illustrated in accordance with the embodiment of the present application.

Figure 10:
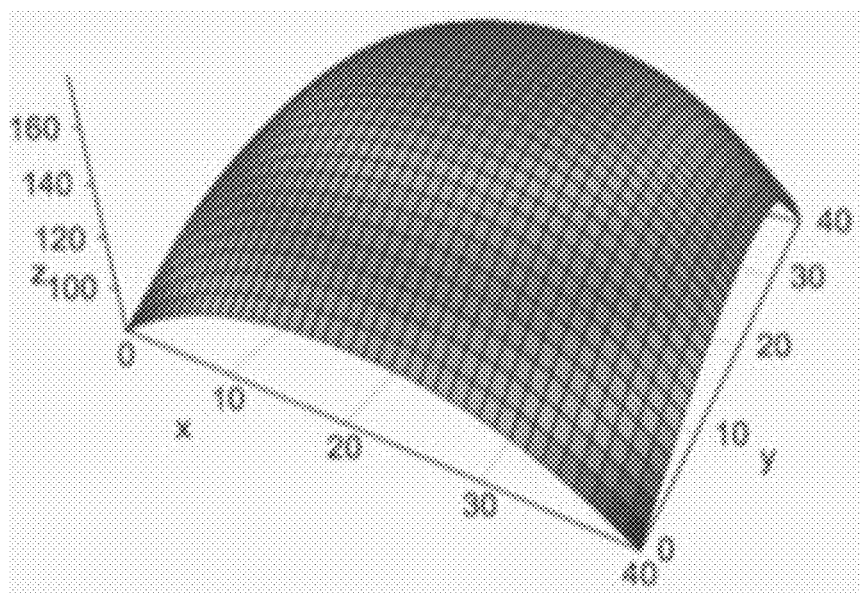
FIG. 10 illustrates a measurement of light intensity 20 cm away from plurality of LED light bulbs, showing distribution of light energy remain fairly even across the whole grow tray 203 of size 334 mm×259 mm, with light intensity range of 100-170 $\mu mol\ m^{-2}s^{-1}$, in accordance with an embodiment of the present application.

Now referring to FIG. 10 a measurement of light intensity 20 cm away from plurality of LED light source, showing distribution of light energy remain fairly even across the whole grow tray 203 of size 334 mm×259 mm, with light intensity range of 100-170 µmol m$^{-2}$s$^{-1}$ is illustrated in accordance with the embodiment of the present application.

Figure 5:
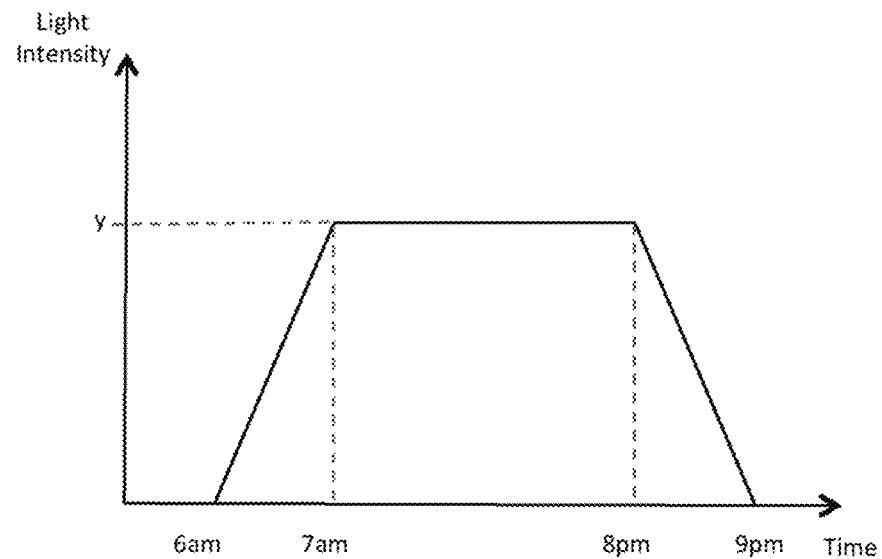
FIG. 5 illustrates a graph of changing light intensity per sunrise/sunset operations and light intensity settings in different grow modes, in accordance with an embodiment of the present application.

Now referring to FIG. 5, a graph of changing light intensity per sunrise/sunset operations and light intensity settings in different grow modes is illustrated, in accordance with the embodiment of the present application. In one embodiment, the intensity of sources of illumination may be controlled to simulate sunrise and sunset as in the nature. In one embodiment, the processor 112 may control the intensity of light of the plurality of LED light bulb 145-148 associated with channels 125, 126, 127, 128 or more channels to turn ON gradually, from minimum light intensity to brightness of grow mode selected, or turn OFF gradually, from the brightness of grow mode selected to minimum light intensity, within a predefined period of time.

In one exemplary embodiment, the user may select and set time for sunrise and sunset for a connected hydroponic apparatus. In one exemplary embodiment, default setting may comprise 6 am as time of sunrise and 9 pm as time of sunset. In another exemplary embodiment, the user may select Auto mode, Dim mode or White mode. In auto mode, light intensity of plurality of LED Light bulbs may change automatically according to plant growth program selected and the sunrise/sunset setting. In dim mode, light intensity of plurality of LED Light bulbs may change to a lower light setting. In one embodiment, the user may select the brightness and select a timeout period for the system to go back to auto mode. In white mode, light intensity of plurality of LED light bulbs may change to white light only from zero to full brightness. In one embodiment, the user may adjust the brightness and select a timeout period to go back to auto mode.

Figure 16:
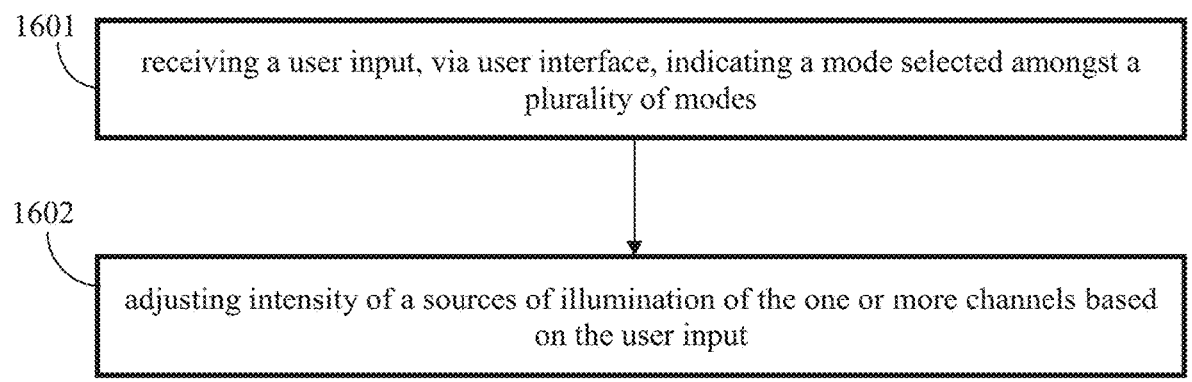
FIG. 16 illustrates a method for controlling light for hydroponic cultivation, in accordance with an embodiment of the present application.

Now referring to FIG. 16, a method for controlling light for hydroponic cultivation is illustrated, in accordance with the embodiment of the present application.

At step 1601, the mode selection module 1505 may receive the user input. In one embodiment, the mode selection module 1505 may receive the user input via the user interface 1502. The user input received may indicate a mode selected amongst a plurality of modes. Each mode of plurality of modes has a predefined intensity level and nutrient level for growth of plant. In one embodiment, the plurality of mode may comprise a germination mode, a normal planting mode, a fast planting mode, a slow planting mode and a harvest mode.

At step 1602, the intensity adjustment module 1506 may adjust the intensity of the sources of illumination of the one or more channels based on the user input received.

In one exemplary embodiment, the hydroponic cultivation apparatus may comprise a software as a standalone unit to perform a plurality of functions. In one embodiment, plurality of functions may comprise set clock, control intensity of light, selection of light, for example "All ON" and "ALL OFF", provide notification on the display, start/stop/resume planting, reset to factory setting, provide notifications of growth environment conditions (air temperature, humidity, water temperature, water level, nutrient content, light intensity etc).

In one exemplary embodiment, the user may initiate the communication with the hydroponic cultivation apparatus by clicking on the application icon of the application residing in the user device 150. The user may register to the application stored on the computer-based platform by providing user details. In one embodiment, the user may create a user profile using a Facebook®, Instagram® or email sign in. In one embodiment, user can update their username and other optional items: profile picture, gender, and birthday. In one embodiment, the user may select option to connect to one hydroponic apparatus or multiple hydroponic cultivation apparatus. In one embodiment, the user device 150 may show the list of multiple users connected to a particular hydroponic cultivation apparatus.

In one exemplary embodiment, the user may select plant growth program by scanning QR code on the seed kit. In another embodiment, the user may select plant growth program by selecting one of the plant species displayed on the application residing on the user device 150.

In one embodiment, the application residing on the user device 150 may provide a status summary report. In one embodiment, the status summary report may comprise the latest measurements of air temperature in grow area, humidity in grow area, water temperature within the grow tray 203, water temperature within the reservoir 201, nutrient concentration, total water content in both the grow tray 203 and the reservoir 201.

In one embodiment, the application residing on the user device 150 may provide graphical presentation of past data of measurements of air temperature in grow area, humidity in grow area, water temperature within the grow tray 203, water temperature within the reservoir 201, nutrient concentration, total water content in both the grow tray 203 and the reservoir 201.

In one embodiment, the application residing on the user device 150 may provide the options such as start/stop/resume for user to select "Start", "Stop" or "Resume" planting. In one embodiment, the hydroponic cultivation apparatus may keep track of number of days each grow mode has been selected and operated for a single planting cycle (a single planting cycle means the period from 'start planting' is selected until 'stop planting' is selected). In one exemplary embodiment, a push notification may be sent to the user device 150 at situations of the following measurements exceed factory preset boundaries: water level too high or too low, nutrient concentration too high or too low, water temperature too high or too low, air temperature too high or too low, grow tray is being removed or not well fit to docking, reservoir is being removed or not in place properly, submersible sensor probe is being removed or not in place properly.

In one exemplary embodiment, the user may select water flow frequency settings. In one exemplary embodiment, the user may set ebb & flow frequency, for example 30 minutes per hour or 15 minutes per hour (Default factory setting) or 15 minutes every two hours or stop running for some hours and then resume to last setting.

In one exemplary embodiment, the user may use a camera associated with the user device 150 in order to take photo/photos to share with other users through posting images to social media or to be store in calendar in applications. In one embodiment, the light intensity setting may change automatically to photo taking mode when photo button is clicked In one embodiment, application residing on the user device 150 may comprise calendar. In one embodiment calendar may be used to store record of status summary per day, and to store photo taken and selected by user per that particular day. Upon photos taken by user and stored in calendar, application residing on the user device 150 may link up those photos, per user-selected time period in the calendar, to become a time-lapse video.

In one embodiment, a one-page data summary or photo with data summary may be share on social media. Time-lapse video created may also be shared on social media.

In one embodiment, knowledge and interest groups may be created on social media. In one embodiment, knowledge and interest groups may built based on planting, cooking, health and fitness, food nutrient, education, community, gamification.

In one embodiment, the application residing on the user device may provide to link for online shopping.

Although implementations for an apparatus, a system, a method and a light control device for facilitating hydroponic cultivation have been described in language specific to structural features and/or methods, it is to be understood that the appended claims are not necessarily limited to the specific features or methods described. Rather, the specific features and methods are disclosed as examples of implementations for an apparatus, a system, a method and a light control device for facilitating hydroponic cultivation.

What is claimed is:

1. A hydroponic cultivation apparatus, comprising:
a cabinet for providing a housing for a reservoir, a plinth, and a grow tray with a grow tray lid;
the grow tray placed on a base of the cabinet in such a manner that the reservoir, placed upon the plinth, is located at a higher position adjacent to the grow tray for optimizing a liquid circulation from the reservoir to the grow tray and vice-versa using one or more pipes, a solenoid valve and a pump, wherein the base further comprises:

a dock coupled to the grow tray for providing an electrical connectivity to the grow tray and simultaneously allowing a liquid to flow through the grow tray without being leaked, one or more touch buttons for receiving an input of a user, and a display for displaying notification to the user, and wherein the cabinet is having a roof provided with sources of illumination for providing light required for plant growth, and wherein the roof comprises connection pads coupled to a sensing probe placed within the reservoir for providing an electrical connectivity to the sensing probe and simultaneously allowing the liquid to flow through the plinth without being leaked.

2. The hydroponic cultivation apparatus of claim 1, wherein the sources of illumination comprise a plurality of light-emitting diode (LED) light bulbs, and wherein the display comprises at least one of a light-emitting diode (LED) display, an organic light-emitting diode (OLED) display and an LCD display.

3. The hydroponic cultivation apparatus of claim 2, wherein the display is integrated to the base of the cabinet.

4. The hydroponic cultivation apparatus of claim 3, wherein the display is integrated with the base in a hidden manner by covering the display with a solid polyvinyl chloride (PVC) sheet.

5. The hydroponic cultivation apparatus of claim 4, wherein the PVC sheet has a 0.4 mm thickness.

6. The hydroponic cultivation apparatus of claim 2, wherein the display automatically turns OFF in response to the hydroponic cultivation apparatus being in idle state for a period of time.

7. The hydroponic cultivation apparatus of claim 6, wherein the period of time is 5 minutes or 10 minutes.

8. The hydroponic cultivation apparatus of claim 2, wherein the display automatically turns ON in response to the hydroponic cultivation apparatus being waken up.

9. The hydroponic cultivation apparatus of claim 8, wherein the hydroponic cultivation apparatus is waken up by a power up sequence.

10. The hydroponic cultivation apparatus of claim 8, wherein the hydroponic cultivation apparatus is waken up from a sleep mode by a detection of a touch on the one or more touch buttons.

11. The hydroponic cultivation apparatus of claim 8, wherein the hydroponic cultivation apparatus is waken up from a sleep mode by a detection of a motion by a proximity sensor attached with the plinth.

12. The hydroponic cultivation apparatus of claim 1, wherein the dock is coupled to the grow tray using a pair of couplers and a pair of pogo pins for providing the electrical connectivity to the grow tray.

13. The hydroponic cultivation apparatus of claim 1, wherein the dock comprises a female coupler, and the grow tray comprises a male coupler.

14. The hydroponic cultivation apparatus of claim 13, wherein the female coupler comprises a first water pipe and pogo pin pads, and the male coupler comprises a second water pipe and pogo pins.

15. The hydroponic cultivation apparatus of claim 1, wherein a trail on the base of the cabinet matching a groove at a bottom of the grow tray is provided to guide a position of the grow tray to the dock.

16. The hydroponic cultivation apparatus of claim 1, wherein the grow tray lid is configured in such a manner that when the grow tray lid is removed from the grow tray for checking or cleaning of the grow tray, the grow tray lid stands up on its own for root protection.

17. The hydroponic cultivation apparatus of claim 1, further comprising various accessories including seed kits, grow hole covers and germination domes, the seed kits providing seed capsules and nutrient which are tailor-made to fit into and work together with the hydroponic cultivation apparatus, the seed capsules being fitted in a grow basket;

the grow hole covers being placed on holes of the grow tray lid where any seed capsules are not placed into the holes;

the germination domes being transparent domes which are placed on top of each seed capsule for plant germination.

18. The hydroponic cultivation apparatus of claim 17, wherein the grow tray lid is configured in such a manner that when the grow tray lid is placed on a flat surface, the grow basket is not squashed and pushed out by the grow tray lid.

19. The hydroponic cultivation apparatus of claim 1, wherein the sensing probe placed within the reservoir is coupled to a processor using a pair of connection pads and pogo pins, the coupling facilitating the electrical connectivity to provide power to the sensing probe and to collect sensor data from the sensing probe.

20. The hydroponic cultivation apparatus of claim 19, wherein the sensor data comprises liquid level detection data, electrical conductivity measurement data, water temperature measurement data, and pH measurement data.

* * * * *